(12) United States Patent
Chaufer et al.

(10) Patent No.: US 6,596,173 B1
(45) Date of Patent: Jul. 22, 2003

(54) INORGANIC FILTERING MATERIAL MODIFIED WITH ORGANOMINERAL GRAFTING AND PREPARATION METHOD

(75) Inventors: Bernard Chaufer, Betton (FR); Jun Kong Liou, Beynost (FR); Anne Bouguen, Tregueux (FR); Murielle Rabiller-Baudry, Cesson-Sevigne (FR); Luc Millesime, Nogent sur Marne (FR)

(73) Assignee: Orelis, Courbevoie Cedex (FR)

( * ) Notice: Subject to any disclaimer, the term of this patent is extended or adjusted under 35 U.S.C. 154(b) by 0 days.

(21) Appl. No.: 09/555,842

(22) PCT Filed: Dec. 2, 1998

(86) PCT No.: PCT/FR98/02603

§ 371 (c)(1),
(2), (4) Date: Oct. 4, 2000

(87) PCT Pub. No.: WO99/29402

PCT Pub. Date: Jun. 17, 1999

(30) Foreign Application Priority Data

Dec. 4, 1997 (FR) ............................................. 97 15327

(51) Int. Cl.$^7$ ................................................. B01D 29/00
(52) U.S. Cl. .................. 210/650; 210/490; 210/500.25; 210/500.27
(58) Field of Search ................................ 210/650, 651, 210/490, 500.25, 500.27

(56) References Cited

U.S. PATENT DOCUMENTS

| 4,861,480 | A | * | 8/1989 | Berardo et al. |
| 4,992,178 | A | * | 2/1991 | Chaufer et al. |
| 5,961,835 | A | * | 10/1999 | Sarrade et al. |

FOREIGN PATENT DOCUMENTS

| FR | 2230405 | 12/1974 |
| FR | 2418204 | 9/1979 |
| WO | 0503087 A1 | 9/1992 |

OTHER PUBLICATIONS

M. Smaihi, et al, "Organic–Inorganic–Inorganic Gas Separation Membranes: Preparation and Characterization", Journal of Membrane Science, Journal of Membrane Science, vol. 116, No. 2, Aug. 7, 1996, pp. 211–220, XP000730132.

* cited by examiner

Primary Examiner—Betsey Morrison Hoey
(74) Attorney, Agent, or Firm—Burns, Doane, Swecker & Mathis, L.L.P.

(57) ABSTRACT

The invention concerns an inorganic filtering membrane characterized in that it comprises a support made of an inorganic material coated with at least a membrane separating layer consisting of metal hydroxide and/or oxide particles and at the surface of which organomineral and/or mineral units are covalently grafted. The invention also concerns a method for preparing said membranes and their use for filtering.

34 Claims, 1 Drawing Sheet

INORGANIC FILTERING MATERIAL MODIFIED WITH ORGANOMINERAL GRAFTING AND PREPARATION METHOD

The present invention relates to filtration membranes which are modified by grafting with organominerals and/or minerals, and to a process which is useful for preparing the said membranes.

Membranes have been known for many years for their separating properties. To date they have been widely exploited industrially as replacements for conventional separating techniques, in many sectors of activity, such as in agrifoods, biotechnology and the processing of water and of effluents from the chemical, electronic or nuclear industries.

This technological transfer towards membrane-based separating techniques, especially in the fields of ultrafiltration and microfiltration, is a direct consequence of the understanding of the mechanisms involved and especially the advances in synthetic membranes, in particular with the appearance of a new generation of membranes: inorganic membranes and in particular those consisting of ceramic materials.

These inorganic membranes offer specific advantages over their organic homologues: their mechanical strength as well as their chemical, biological and thermal inertia make them long-lasting and especially allow them to be used under extremely severe conditions.

Illustrations of these inorganic membranes which may be mentioned in particular are microporous membranes made of a metal such as silver or nickel, or of glass, and most particularly carbon membranes, or membranes made of an oxide such as alumina or zirconia.

The technique most commonly used for preparing these ceramic membranes consists in depositing one or more selective layers a few microns in thickness, constituting the filtering layer, onto a macroporous support matrix which provides the mechanical strength. Membranes made of γ-alumina and α-alumina deposited on α-alumina supports, tubular membranes made of zirconia on a carbon support (Carbosep® from the company Orelis) and more recently zirconia membranes on a monolithic support made of metal oxides (Kerasep® from the company Orelis; EP 585 152) have thus been developed. The filtering layer is usually obtained by depositing mineral oxides onto the matrix, followed by a final heat treatment.

In general, the filtration membranes are characterized by the following parameters: their permeability to water and to air, the size distribution of their pores and their retention.

As more particularly regards this last parameter, it is conventionally measured from the rate of retention of the solute under consideration, which is defined by the following equation:

$$R = 1 - \frac{Cp}{Co}$$

with Cp being the concentration of solute in the permeate and Co being the concentration of solute in the initial solution. Thus, the cutoff threshold of the membrane corresponds to the molecular mass of the smallest solute retained to a level of 90% by the membrane.

The studies carried out in the context of the present invention have the object, specifically, of optimizing the selectivity of inorganic filtration membranes.

It has been demonstrated, unexpectedly, that a modification of the surface of the filtering layer of these inorganic membranes by grafting with organominerals and/or minerals significantly increases their selectivity towards various solutes.

A first subject of the present invention is thus an inorganic filtration membrane, characterized in that it comprises a support made of inorganic material coated with at least one separating membrane layer consisting of particles of metal hydroxide(s) and/or oxide(s), at the surface of which are covalently grafted organomineral and/or mineral units.

The grafting of these organomineral and/or mineral units at the surface of the separating membrane layer advantageously makes it possible to significantly improve its selectivity with regard to solutes.

This grafting is based on the establishment of covalent bonds between the mineral functions of the metal hydroxides and/or oxides in the separating membrane layer and those of the organomineral and/or mineral units.

For the purposes of the present invention, the expression "inorganic filtration membrane" is intended to cover inorganic membranes which can be used for microfiltration, ultrafiltration or nanofiltration.

Microfiltration and ultrafiltration are among the family of membrane-based separating techniques in which the driving force for the transfer is a pressure gradient. The operating principle thus consists in circulating the liquid to be treated under pressure along a membrane which is permeable to solvent but impermeable to the solutes which it is desired to retain.

The distinction between microfiltration and ultrafiltration is purely linked to the size of the elements to be separated. It is generally accepted that microfiltration concerns particles in suspension which are greater than 0.2 μm in size, while ultrafiltration separates in the range of macromolecules with molecular masses of greater than a few thousand up to colloidal particles 0.2 μm in diameter.

Generally, microfiltration is conventionally used for the purposes of clarification and sterilization, and ultrafiltration preferentially concerns the separation of macromolecular solutes.

As regards nanofiltration, this more particularly concerns the retention of solutes with a molecular mass of greater than 1000 g/mol.

The organomineral and/or mineral units grafted onto the surface of the separating membrane layer are generally derived from hydrolysable organometallic complexes comprising at least one titanium and/or zirconium atom.

According to one preferred embodiment of the invention, these organometallic complexes are chosen from organotitanates, organozirconates and organozircoaluminates.

As organotitanates which are suitable for the invention, mention may be made most particularly of those of the alkoxy, neoalkoxy and chelate type.

As regards the zirconates, the species concerned are in particular those of the neoalkoxy, chelate or organozircoaluminate type.

The organometallic complexes more preferably concerned are:

organotitanates or organozirconates corresponding to either of the general formulae I and II below:

I

II in which:

M represents a titanium or zirconium atom,

R represents a group

—CH$_3$(OC$_2$H$_4$)$_2$—

R$_1$ and R$_2$, which may be identical or different, represent a non-hydrolysable organic radical,
X represents a methylene or CO group,
m and n are equal to 0, 1, 2 or 3 and p is equal to 1 or 2 on condition that the sum of n, p and m is equal to 4 and with
when p is equal to 1,
Z$_1$ and Z$_2$, which may be identical or different, representing
—O—, —OC(O)—, —OC(O)O—, —OP(O)(O—)$_2$, —OP(O)(OH)P(O) (O—)$_2$, OP(O)(OH)P(O)(O—)$_3$, OP(O)(O—)$_3$, OS(O)$_2$— or OS(O)$_2$ (—)$_3$ and
when p is equal to 2,
Z$_1$ and Z$_2$ together forming a divalent chain of cyclic structure such as a cyclopyrophosphite;
or an organozircoaluminate corresponding to the general formula III below:

III with R representing a (CH$_2$)$_2$, (CH$_2$)$_4$ or (CH$_2$)$_{12}$ hydrocarbon-based chain and X representing an NH$_2$, SH, OH, COOH or group.

As regards the substituents R$_1$ and R$_2$ of general formulae I and II, they are preferably chosen from alkyl, cycloalkyl, alkoxyalkyl, phenyl and phenylalkyl groups optionally substituted with alkoxy, alkylthio, alkoxycarbonyl or alkylcarbonyl groups, for example.

The following organotitanates or organozirconates are preferably used:
isopropyl tri(N-ethylaminoethylamino)titanate,
neoalkoxytri(N-ethylaminoethylamino)titanate,
neoalkoxytri(neodecanoyl titanate,
isopropyl tri(isostearoyl)titanate,
isopropyl tri(dioctylphosphato)titanate,
trineoalkoxy(dioctylphosphato)titanate,
trineoalkoxy(neodecanoyl)zirconate,
trineoalkoxy(dodecanoyl)benzenesulphonyl-zirconate,
trineoalkoxy(ethylenediaminoethyl)zirconate, and
trineoalkoxy(m-aminophenyl)zirconate.

All of these organomineral compounds react via their hydrolysable group(s), i.e. their alkoxy or carboxyl function(s) for example, with the mineral functions of the separating membrane layer and thus establish covalent bonds at the surface of the said layer.

A subject of the present invention is also an inorganic filtration membrane comprising a support made of inorganic material coated with at least one separating membrane layer consisting of particles of metal hydroxide(s) and/or oxide(s), characterized in that it comprises, at the surface of the said separating membrane layer, a molecular layer comprising organomineral units grafted onto the surface of the said separating layer, the said organomineral units corresponding to the general formula IV below:

$$(—)_p M[Z_1 R_1]_n [Z_2 R_2]_m \qquad \text{IV}$$

in which:
M represents a titanium or zirconium atom,
R$_1$ and R$_2$, which may be identical or different, represent a non-hydrolysable organic radical,
m and n are equal to 0, 1, 2 or 3 and p is equal to 1 or 2, on condition that the sum of n, p and m is equal to 4 and with
when p is equal to 1,
Z$_1$ and Z$_2$, which may be identical or different, representing
—O—, —OC(O)—, —OC(O)O—, —OP(O)(O—)$_2$, —OP(O)(OH)P(O)(O—)$_2$, OP(O)(OH)P(O)(O—)$_3$, OP(O)(O—)$_3$, OS(O)$_2$— or OS(O)$_2$(—)$_3$ and
when p is equal to 2,
Z$_1$ and Z$_2$ together forming a divalent chain of cyclic structure such as a cyclopyrophosphite.

As regards R$_1$ and R$_2$, they can in particular represent groups as defined previously.

The grafted organomineral units are preferably chosen from tri(N-ethylaminoethylamino)titanate, tri(neodecanoyl) titanate, tri(isostearoyl)titanate and tri(dioctylphosphato) titanate derivatives.

As regards the mineral units grafted onto the surface of the membranes claimed, they can be obtained by treating the grafted organomineral units identified above and more specifically by removing the organic functions from these organomineral units.

In this instance, the treatment may be an acid or alkaline hydrolysis in oxidizing medium. Thus, in the particular case of grafted organotitanates, their treatment in highly alkaline medium and in the presence of an oxidizing agent, for example of peroxide or hypochlorite type, makes it possible to remove all of the organic functions present on the grafts. Only the mineral functions of the initial organomineral units are conserved at the surface of the separating membrane layer.

The mineral units are preferably Ti(OH)$_3$, Ti(OH)$_2$, Zr(OH)$_3$ and/or Zr(OH)$_2$.

According to one preferred embodiment of the invention, the grafts present at the surface of the separating membrane layer are of the same nature. However, a separating membrane layer can be grafted with grafts which differ on the basis of their chemical nature, i.e. organomineral or mineral nature.

Similarly, it is possible to have different organomineral units among the organomineral units grafted at the surface of the said separating layer, and the same goes for the mineral units.

In this instance, the corresponding grafting operations according to the process described below can be carried out consecutively without intermediate hydrolysis.

The grafted membranes obtained according to the invention advantageously have a significantly increased degree of retention of neutral solutes when compared with an inorganic membrane of the same composition but which is non-grafted.

The maximum capacity for grafting to the surface of the membrane obviously depends on the nature of the unit to be grafted and on its bulk.

The degree of grafting at the surface of the said separating membrane layer more particularly ranges between about 10 and about 80%.

As regards the support for the membrane according to the invention, it is an inorganic support which can be composed of a metal, glass, carbon, silicon carbide, metal carbides or metal oxides.

The support is usually macroporous.

The support is preferably either carbon or a ceramic monolithic support.

As regards the monolithic supports which can be used according to the invention, reference will be made in particular to the teaching of patent application EP 585 152 (in particular column 3, line 24 to column 4, line 11).

Such a support preferably has an average equivalent pore diameter $Ds$ of between 1 and 20 $\mu m$, more preferably from 5 to 15 $\mu m$, and a porosity (measured with a mercury porosimeter) of greater than 30%, in particular greater than 40%. This support is more preferentially a ceramic made of grains of alumina $Al_2O_3$ at least partially coated with grains of titanium oxide $TiO_2$. The percentage by weight of titanium oxide $TiO_2$ relative to the total weight of $Al_2O_3$ and $TiO_2$ is between 1% and 75% and preferably between 20% and 50%.

The alumina grains generally have a particle size of between 3 and 500 $\mu m$, preferably between 10 and 100 $\mu m$ and even more preferably between 20 and 30 $\mu m$.

The $TiO_2$ grains have a particle size of between 0.01 and 7 $\mu m$, preferably between 0.1 and 1 $\mu m$.

According to one preferred embodiment of the invention, the alumina is an alumina of corundum type whose grains have a tabular shape and the percentage by weight of titanium oxide $TiO_2$ relative to the total weight of alumina and $TiO_2$ is between 20 and 40%.

Preferably, the alumina is essentially of corundum type and the titanium oxide is essentially of rutile type.

The ceramic monolithic supports which can be used according to the invention are generally multi-channel supports. The number of channels therein can thus be between 3 and 52, in particular equal to 7 or 19. The diameter of the said channels can be in particular between 1.5 and 7 mm, for example between 2.5 and 4.5 mm.

These supports can have a diameter of between 15 and 30 mm.

As regards the separating membrane layer to be modified by grafting, it is formed from simple or mixed metal hydroxide(s) and/or, preferably, metal oxide(s).

This separating membrane layer to be modified by grafting can be a separating membrane layer for microfiltration or, preferably, ultrafiltration or, more preferably, nanofiltration.

When the layer to be modified by grafting is a separating microfiltration membrane layer (i.e. in the case of an inorganic microfiltration membrane), it is located at the surface of the support and preferably consists of sintered metal hydroxide and/or metal oxide particles whose average equivalent pore diameter $Do$ before sintering is between 0.1 and 3.0 $\mu m$ in a $Ds/Do$ ratio such that $0.3<Ds/Do<200$, in particular $1<Ds/Do<150$, the said layer having an average equivalent pore diameter $Dm$ of between 0.05 and 1.5 $\mu m$.

This separating microfiltration membrane layer can be formed from a stack of several layers of this type.

When the layer to be modified by grafting is an ultrafiltration membrane layer (i.e. in the case of an inorganic ultrafiltration membrane), it is preferably located on a microfiltration membrane layer, in particular as defined above, and preferably consists of sintered metal hydroxide and/or metal oxide particles whose equivalent pore diameter $Du$ before sintering is between 2 and 100 nm in a $Dm/Du$ ratio such that $0.5<Dm/Du<750$.

Similarly, this separating ultrafiltration membrane layer can be formed from a stack of several layers of this type.

When the layer to be modified by grafting is a nanofiltration membrane layer (i.e. in the case of an inorganic nanofiltration membrane), it is preferably located on an ultrafiltration membrane layer, in particular as defined above, and preferably consists of sintered metal hydroxide and/or metal oxide particles whose average equivalent pore diameter $Dn$ before sintering is between 0.5 and 2 nm, in particular between 0.5 and 1.5 nm.

Similarly, this separating nanofiltration membrane layer can be formed from a stack of several layers of this type.

The metals in the metal hydroxides or, preferably, metal oxides forming the abovementioned separating membrane layers, in particular those to be modified by grafting, can be chosen, for example, from beryllium, magnesium, calcium, aluminium, titanium, strontium, yttrium, lanthanum, zirconium, hafnium, thorium, iron, manganese and silicon and various possible mixtures thereof.

The abovementioned separating membrane layers are advantageously formed from metal oxide(s). In general, they are made of alumina, preferably of titanium oxide and/or of zirconia; these oxides may then optionally comprise, in order, a structure-stabilizing metal chosen from yttrium, calcuim, magnesium and a rare-earth metal, and mixtures thereof.

The metal oxide(s) in the microfiltration membrane layer is (are) generally alumina, zirconia or, preferably, titanium oxide.

The microfiltration membrane layer is usually deposited on the support by the process known as slip casting, according to which a metal oxide slip is generally deposited on the support and a suitable sintering operation is then carried out. The sintered membrane layer is preferably between 5 and 50 $\mu m$ thick.

The sintering temperature should be compatible with the maximum sintering temperature of the support. Thus, when the support is made of corundum and rutile, a membrane layer based on titanium oxide whose sintering temperature is less than 1275° C. is preferably used.

The microfiltration membrane layer should very preferably not penetrate substantially into the support. The interpenetration of this membrane layer is thus generally less than 2 $\mu m$, in particular less than 0.5 $\mu m$.

For this, it is possible, before slip-casting, to fill the porosity of the support with an organic binder which decomposes at the time of sintering, for example such as a melanine/formaldehyde resin: it is also possible to close off the orifices of the pores of the support using very fine powders of products which are eliminated by combustion in air, for example such as carbon black.

The metal oxide(s) of the ultrafiltration membrane layer can be, in particular, titanium oxide or, preferably, zirconia.

The sintered metal oxide particles are generally obtained here:
  either with an oxide and a process for depositing the layer that are similar to those used for the microfiltration membrane layer (only the particle size changes),
  or by heat treatment of hydrated oxide particles obtained by a process of sol-gel type and deposited by the slip-casting method.

The membrane layer advantageously has an average equivalent pore diameter of between 2 and 100 nm, in particular between 2 and 50 nm, which makes it particularly suitable for receiving a nanofiltration membrane layer.

The ultrafiltration membrane layer very preferably should not penetrate substantially into the microfiltration membrane layer.

When the ultrafiltration membrane layer is zirconia, the said layer has a cutoff threshold of between 10 and 300 kD (1 kD=$10^3$ daltons), for example equal to 15 kD.

It should be noted that a monolithic support+microfiltration membrane layer+ultrafiltration membrane layer assembly can form an ultrafiltration membrane as illustrated in patent application EP 585 152.

The metal oxide of the filtration membrane layer is preferably zirconia.

The nanofiltration membrane layer is advantageously obtained by a process of sol-gel type, preferably comprising hydrolysis in alcoholic medium, for example in propanol.

The nanofiltration membrane layer can thus be a layer of zirconia obtained by a process of sol-gel type comprising:

the formation of a sol by hydrolysis in alcoholic medium, for example in propanol, of a zirconium alkoxide precursor, preferably in the presence of a complexing ligand for controlling the hydrolysis, in accordance with that which is described in patent application EP 627 960; it is possible, for example, to form such a sol by hydrolysing zirconium propoxide ($Zr(OC_3H_7)_4$) in propanol in the presence of the complexing ligand acetylacetone;

the deposition of the sol onto the ultrafiltration membrane layer; this deposition is preferably obtained by placing in contact, by filling, channels of the ultrafiltration membrane layer (and thus the ultrafiltration membrane) and the sol prepared previously, to which an organic binder will have previously been added, for example polyvinyl alcohol, in order to adjust the viscosity;

conversion of the sol into a gel by drying;

finally, a heat treatment, which allows the conversion of the gel layer into a layer of metal oxide (zirconia).

Operating conditions for preparing the sol (alkoxide content, complexing ligand content) and/or drying and heat treatment (temperature) conditions are preferably chosen so as to obtain a so-called microporous membrane (average pore diameter generally of about 1 nm); the drying temperature can thus be between 40 and 100° C.; the heat treatment temperature is in particular between 350 and 600° C.

As an illustration of inorganic filtration membranes which can be modified by grafting, according to the invention, mention may be made most particularly of the Carbosep® membranes conventionally provided for ultrafiltration and the Kerasep® membranes intended more particularly for use in microfiltration and ultrafiltration, or for use in nanofiltration when they comprise a nanofiltration membrane layer, in particular zirconia, preferably obtained by a process of sol-gel type.

Another subject of the present invention is a process which is useful for preparing inorganic filtration membranes which are modified by grafting with organomineral and/or mineral units as defined above.

More specifically, this process comprises:

conditioning the separating membrane layer of the said membrane in the solvent of the grafting solution, circulating the grafting solution, comprising at least one organomineral to be grafted, through the conditioned separating membrane layer, under operating conditions that are suitable for carrying out the said grafting, rinsing the said grafted separating membrane layer, so as to remove therefrom the excess of unreacted organominerals, and where appropriate, treating the grafted organomineral units in order to remove their organic functions, and drying the said grafted membrane.

As regards the organomineral to be grafted, this is advantageously a hydrolysable organometallic complex comprising at least one titanium or zirconium atom. More preferably, it is an organotitanate or an organozirconate as defined in formula I, II or III and in particular one of those identified previously.

As regards the choice of the solvent, it is generally dictated by the nature of the organomineral which it is desired to graft and in particular by the nature of the group $R_2$ for the organometallic compounds corresponding to the general formula I. It is preferably an aqueous or alcoholic solvent. More preferably, it is isopropanol. This solvent is particularly advantageous for converting the separating membrane layer by units derived from organominerals bearing one or more hydrophilic groups. However, aromatic solvents such as xylene and toluene are also found to be suitable for grafting organominerals having a hydrophobic nature, in particular on account of the hydrophobic nature of their group $R_2$ for the compounds defined in the general formula I.

As regards the conditioning of the separating membrane layer to be converted, it is preferably carried out in a closed circuit.

This operation is more preferably carried out under a pressure of about 1 bar.

The grafting is carried out by circulating a solution of the organomineral to be grafted (grafting solution) through the inorganic filtration membrane to be modified.

As regards the grafting solvent used, it is the solvent selected for the previous step, relating to the conditioning of the separating membrane layer.

The grafting solution generally has a concentration of between about 5 and about 100 g/l of at least one organomineral and preferably between about 20 and about 70 g/l.

The grafting solution is preferably circulated through the membrane in a closed circuit with recycling of the permeate and of the retentate.

As regards the temperature during the grafting operation, this can be around room temperature, i.e. from 20 to 25° C. An increase in temperature can advantageously allow the grafting reaction to be accelerated. According to one variant of the invention, the grafting is carried out at a temperature of between about 65 and 70° C.

At the end of the reaction, the circulation circuit can be emptied and, if necessary, the whole device can be left to cool to at least a temperature of 30 to 40° C. The assembly is then rinsed so as to rid the membrane of all trace of organominerals which have not reacted with the membrane. The solvent used in this rinsing step is preferably the same or similar to that used in the previous steps.

According to one preferred embodiment of the invention, after this rinsing operation, the membrane is equilibrated with deionized water and is then dried under conventional operating conditions.

According to one variant of the process claimed, after the rinsing step and before the drying of the grafted membrane, an additional treatment is carried out to remove the organic functions present on the grafted organomineral units.

This treatment can consist in particular of acidic or alkaline hydrolysis in an oxidative medium for the said membrane. For example, it can be hydrolysis with a sodium hydroxide solution in the presence of hypochlorite. However, it is clear that other treatments which are as effective as this type of hydrolysis can be envisaged to remove the organic functions present at the surface of the said membrane.

The membrane is then rinsed and dried.

This variant of the process claimed has the advantage of giving an inorganic membrane which comprises only mineral functions at the surface. This is of potential value in terms of reactivity.

Specifically, it is found that it is possible to envisage a new grafting operation at the surface of the grafted membrane. New covalent functions can be established between these mineral functions and those of an organomineral, of the same nature or otherwise.

Accordingly, according to a second variant of the process claimed, a new grafting operation according to the protocol outlined above is carried out at the surface of the inorganic membrane grafted with mineral units, which is obtained as explained above.

In this specific case, a multi-grafted inorganic membrane is obtained.

However, multi-grafted membranes can also be obtained by carrying out a new grafting operation on membranes grafted with non-hydrolysed organomineral units.

The specificities of the membranes to be modified and those obtained according to the process claimed are in fact those mentioned above in the context of the membranes claimed according to the invention.

Finally, as emerges from the examples submitted below, the membranes grafted according to the invention and used more particularly in nanofiltration show solute retentions that are better than those of the original, i.e. non-grafted, membranes.

A modification is observed in the selectivities of the grafted membranes with regard to proteins compared with the base membranes.

Similarly, the functions grafted onto the mineral membranes make it possible to obtain metal ion retentions that are better than those of the base membranes.

Quite probably, the surface covering displays, in the membranes claimed, a smaller pore size.

The present invention is also directed towards the use of the grafted membranes claimed or liable to be obtained according to the invention for filtration.

This can concern microfiltration or, preferably, ultrafiltration or, even more preferably, nanofiltration.

These grafted membranes are found to be particularly advantageous since they are efficient for the recycling of metal ions, the retention of dyes such as, for example, tropaeoline-O, in the treatment of papermaking effluents contaminated with phenolic derivatives, for the isolation of organic molecules such as vitamins, peptides, amino acids, pharmaceutically and/or cosmetically active compounds and for the separation of hydrophobic molecules in non-aqueous medium.

A subject of the present invention is also the use of the inorganic filtration membranes claimed or liable to be obtained according to the invention for the isolation or separation of solutes present in a solution. These may be in particular metal ions, proteins or chemical compounds.

The figures and examples submitted below are given as non-limiting illustrations of the present invention.

Key to the Figures

MATERIALS AND METHODS

A. Membranes

EXAMPLES 1 to 7

The separating membrane layer, at the surface of which organomineral units will be grafted covalently, is a nanofiltration membrane layer consisting of a layer of zirconia obtained by a process of sol-gel type as described previously.

It is deposited on Kerasep® ultrafiltration membranes, which are tubular and consist of a succession of layers:

- a support ($Al_2O_3$—$TiO_2$ monolith, with a $TiO_2/(Al_2O_3+TiO_2)$ weight ratio equal to 25%), having a diameter of 20 mm, comprising 19 channels and having a porosity of about 40% and an average equivalent pore diameter of 5 $\mu$m;
- a layer formed from a stack of increasingly selective layers consisting of titanium oxide and zirconia; the object of this layer (microfiltration membrane layer) is to gradually reduce the average equivalent pore diameter to 0.1 $\mu$m;
- an ultrafiltration membrane layer consisting of zirconia, having a cutoff threshold of 15 kD and an average equivalent pore diameter of about 1 mm and a thickness of 5 nm.

The nanofiltration membrane layer (also known as the sol-gel layer) has an average equivalent pore diameter of about 1 nm and a thickness of about 0.1 $\mu$m.

The inorganic membranes obtained can be referred to in the rest of the specification as Kerasep® sol-gel membranes.

B. The Organominerals Used

These are Ken-React products (Kenrich Petrochemical, Bayonne, New Jersey) distributed in France by the company OMYA Distribution.

Table I below identifies the organominerals used in the examples below.

TABLE I

| Trade name | Formula | Nomenclature | Name |
|---|---|---|---|
| KR 44 ® | $CH_3$—$CH(CH_3)$—O—Ti—[O—$C_2H_4$—NH—$C_2H_4$—$NH_2$]$_3$ | isopropyl tri(N-ethylenediamino)ethyl titanate | Ti-EDA |
| KR 138S ® | (cyclic C—O, $H_2C$—O)Ti—[O—P(=O)(OH)—O—P(=O)—(O—$C_8H_{17}$)$_2$]$_2$ | bis(dioctyl) pyrophosphate oxoethylene titanate | Ti-PPC8 |

TABLE I-continued

| Trade name | Formula | Nomenclature | Name |
|---|---|---|---|
| KR TTS ® | CH₃—CH(CH₃)—O—Ti—[O—C(=O)—C₁₇H₃₅]₃ | isopropyl tri(isostearoyl) titanate | Ti-C17 |
| NZ 38 ® | CH₂=CH—CH₂O—CH₂\\CH₃CH₂—C(—CH₂—O—Zr—[O—P(=O)(OH)—O—P(=O)—O—(C₈H₁₇)₂]₃)\\CH₂=CH—CH₂O—CH₂ | neopentyl (diallyl) oxy, tris (dioctyl) pyrophosphatozirconate | Zr-PPC8 |

C. Solutes Tested

Sucrose

Sucrose is a neutral disaccharide of molar mass 342 g/mol. Its radius is 0.47 nm. A 0.1 mol/l solution of sucrose in demineralized water is used.

Bovine Serum Albumin (BSA)

This is a protein of molecular mass 66,000 g/mol, with an isoelectric point of 4.8 and a radius of 3.6 mm. The protein used corresponds to fraction V sold by the company Fluka®.

Lysozyme

This protein has a molecular mass of 14,400 g/mol, an isoelectric point of 11 and a radius of 1.8 mm.

D. Methods of Analysis

Differential Refractometry

This is used to assay the sucrose. It consists in measuring the optical deflection of a light beam due to the change in refractive index between the sample and the reference. This optical deflection of a light beam, measured relative to water (solvent of the solution), is proportional to the sucrose concentration in the solution to be assayed.

$Cu^{++}$ analysis is carried out by circulating a solution of EDTA (ethylenediaminetetraacetic acid, $10^{-1}$ mol/L, pH 5) through an HPLC pump at a flow rate of 2 ml/min through a pipe of about 2 ml. The samples are injected via a valve equipped with a 50 μl loop. UV detection set at 280 nm is used.

$Zn^{++}$ analysis is carried out by atomic absorption by dilution in HCl (0.02 M).

Analysis of the proteins is carried out with the above HPLC system by circulating distilled water. A detection wavelength of 280 nm is used.

Example 1

Preparation of Grafted Membranes Using Ti-EDA

The membranes to be modified by grafting are membranes as defined in the above section.

The membranes used are referenced in the tables below.

The grafting can be carried out on each of the membranes according to the following protocol:

The membrane is conditioned in the grafting solvent, isopropanol, in a closed circuit and under pressure (P=1 bar) until 100 ml of permeate are obtained. 400 ml of the grafting solution containing 30 g/l of Ti-EDA are then circulated in a closed circuit (recycled retentate and permeate) and under pressure (P=1 bar) for 3 h at 25° C. and for 2 h at 70° C.

A rinsing step is then carried out to remove the excess Ti-EDA. To do this, the assembly is emptied and the membrane rinsed by circulating 200 ml of isopropanol in an open circuit (non-recycled retentate and permeate) followed by 250 ml in a closed circuit and under pressure (P=1 bar) until 80 ml of permeate are obtained. A rinsing operation is carried out in the same manner with demineralized water. The membrane is finally dried in an oven at 60° C. for a few hours.

Example 2

Effect of the Grafting on the Mass and the Permeability to Air of the Grafted Membranes The mass and the permeability were monitored before and after grafting for each membrane.

a) The Permeability to Air

This is evaluated by measuring the flow density of air which passes through the membrane, at a pressure of 2 bar.

b) Monitoring the Mass

This is carried out by weighing the membranes before and after grafting. This monitoring of the mass makes it possible to ensure that the sol-gel layer has not been destroyed during the grafting operation.

The results obtained are given in Table II below:

TABLE II

| | Mass (g) | | g. air ($m^3/s/m^2/bar$) | | |
|---|---|---|---|---|---|
| Membranes | Initial | After grafting | Initial | After grafting | After characterization and cleaning |
| SG965A | 98.87 | 98.87 | 0.033 | 0.026 | 0.026 |
| SG965B | 96.33 | 96.33 | 0.026 | <0.020 | <0.020 |
| S15 | 96.60 | 96.60 | 0.025 | <0.020 | <0.020 |
| S16 | 96.07 | 96.07 | <0.020 | <0.020 | <0.020 |
| SR4 | 98.91 | 98.91 | 0.079 | 0.068 | 0.068 |
| S2B | 94.70 | 94.70 | 0.067 | 0.036 | 0.036 |

For all the grafted membranes, the mass after grafting remains constant. This proves that the grafting takes place at the molecular level and that the sol-gel layer was not destroyed during the grafting operation.

For the 6 membranes, the permeability to air decreases after grafting. This assumes that the Ti-EDA grafts effectively fill some of the pores of the membrane.

Furthermore, the permeability to air measured after characterizing and cleaning the membranes is identical to that measured after grafting.

Consequently, the grafted membranes are of entirely suitable behaviour. They are not deteriorated after retention of a solute and after cleaning.

Example 3

Retention and Permeability of Grafted Membranes with Regard to Neutral Solutes In order to evaluate the effect of the grafting operation on the selectivity of the membranes, they are characterized using sucrose as a neutral model solute.

These measurements are carried out under the following operating conditions: a membrane pressure of 10 bar and a tangential speed of 2.65 m/s at a temperature of 25° C.

Retention

The degrees of sucrose retention are determined by carrying out a tangential filtration for 1 hour in a closed circuit (recycled permeate), in order to keep a constant concentration of species in the retentate.

Every 15 minutes, the flow rate of permeate at 10 bar is measured and a few ml thereof are collected. Moreover, a fraction of retentate is also taken after 15 and 60 minutes, in order to ensure that the solute concentration $C_R$ has remained constant.

This degree of retention depends on the intrinsic properties of the membrane as well as the operating conditions such as the temperature or pressure.

Permeability to Water

This is determined by carrying out a permeation with demineralized water, at 10 bar, by measuring the flow rate of permeate every 15 minutes for about 1 hour, the duration required to establish a stationary state.

The results are given in Table III below.

This table also presents the results obtained after alkaline and oxidative treatment of the grafted membranes in order to remove the organic Ti EDA functions from the surface of their filtering layer.

To do this, the organic part of the grafts is removed by treating the membrane at 80° C. in alkaline medium (0.5 M NaOH–pH=14) in the presence of an oxidizing agent (500 ppm of sodium hypochlorite).

The results obtained with a control membrane, i.e. a non-grafted NF membrane, are also given in this table.

TABLE III

| Membranes | SG965A | S15 | S16 | SR4 | S2B | Control NF |
|---|---|---|---|---|---|---|
| Sucrose retention (%) | sol-gel: 35 after grafting: 60 | 32 73 | 25 60 | 59 70 | 46 65 | 32 |
| Flow rate of water after grafting (1/h/m² at 5 bar and at 25° C.) | 81 | 70 | 73 | 197 | 165 | 122 |
| Final flow rate of water after treatment with 0.5 M NaOH + NaOCl (1 h at 80° C.) | 82 | 69 | 75 | 190 | 170 | 122 |

Effect of the Grafting on the Retention of Sucrose

As regards the selectivity, the membranes obtained are highly satisfactory. Specifically, an improvement in the degrees of retention of sucrose is observed for all the membranes.

In particular, the retention of the grafted membrane (S15) increases significantly from 32 to 73% (compared with the control membrane). The removal of the organic portion of the grafts by alkaline+oxidative treatment advantageously does not modify its characteristics.

Example 4

Preparation of Grafted Membranes Chemically Modified by Alkaline and Oxidative Treatment Starting with the grafted membrane SG965A with the Ti EDA organotitanate prepared in Example 1, the organic portion of the grafts is removed by treating the membrane at 80° C. in alkaline medium (0.5 M NaOH–pH=14) in the presence of an oxidizing agent (500 ppm of sodium hypochlorite).

4 washes are carried out on the membrane SG965A. After each treatment, the water flow rate of the membrane and the sucrose retention are quantified according to the protocols described in Example 3.

The results are given in Table IV below.

TABLE IV

| | Flow rate of water (1/h/m² at 5 bar and at 25° C.) | Degree of retention of sucrose (%) |
|---|---|---|
| Initial sol-gel membrane | 100 | 35 |
| After grafting of KR44 (30 g/l) | 81 | 60 |
| After treatment 1: (0.5 M NaOH + 500 ppm NaClO, 1 h at 80° C.) | 107 | 69 |
| After treatment 2: (0.5 M NaOH + 500 ppm NaClO, 1 h at 80° C.) | 86 | 63 |
| After treatment 3: (0.5 M NaOH + 500 ppm NaClO, 1 h at 80° C.) | 86 | 63 |
| After treatment 4: (0.5 M NaOH + 500 ppm NaClO, 1 h at 80° C.) | 82 | — |

It is observed that during the successive treatments for the removal of the organic portion of the grafts, the water flow rate remains virtually constant. Similarly, the sucrose retention shows little change.

Consequently, these results confirm that the permeability to water and the degree of retention of sucrose change very little during the various successive treatments in chlorinated alkaline medium (0.5 M NaOH+500 ppm of bleach).

This alkaline and oxidative treatment makes it possible to remove the organic portion from the titanate grafts.

Moreover, an elemental analysis carried out on $ZrO_2$ powders functionalized with Ti-EDA grafts showed that the organic portion of the grafts did not withstand washes with 0.1 M NaOH+2 ml/l NaOCl.

This treatment makes it possible to obtain an entirely mineral membrane, with $TiO_2$ grafted onto the $ZrO_2$ filtration layer of the original membrane.

Example 5

Effect of the Nature of Mineral Grafts on the Retention and Permeability to Water of Modified Membranes The membranes in question are grafted according to the protocol described in Example 1, either with Ti-PPC8 or with Zr-PPC8 in solution at 30 g/l. The $C_8$ organic portion of the graft is removed with sodium hydroxide.

Table V below gives the results obtained in terms of permeability and degree of retention with regard to sucrose.

TABLE V

| Membrane | Flow rate of water 5.25 (1/h/m²) | Degree of retention of sucrose (%) |
|---|---|---|
| Ti-PP-grafted sol-gel C11 | 113 | 18 |
| | 107 | 59 |
| Zr-PP-grafted sol-gel S5 | 192 | 26 |
| | 197 | 40 |

The increase in sucrose retention is between 14 and 48%.

Example 6

Preparation of a Multi-grafted Membrane

According to this test, successive graftings are carried out on the filtration layer of an inorganic membrane.

This test is carried out on the membrane S13 which is grafted according to the protocol described in Example 1.

The first grafting is carried out using a solution containing 30 g/l of Ti EDA in isopropanol.

After characterizing the membrane with sucrose, it is cleaned with sodium hydroxide (0.5 M) for 1 hour at room temperature.

A second grafting is then carried out using the same protocol as previously, with a 70 g/l solution.

The results featured in Table VI below show the degrees of retention manifested with regard to sucrose at different stages of preparation of the multi-grafted membrane.

TABLE VI

| Kerasep ® sol-gel S13 | Flow rate of water 5.25 (1/h/m²) | Degree of retention of sucrose (%) |
|---|---|---|
| start | 191 | 20 |
| grafting of Ti-EDA (30 g/l) followed by washing with 0.1 M NaOH, room temp., 20 min | 170 | 66 |
| 0.5 M NaOH, room temp. | 186 | — |
| grafting of Ti-EDA (70 g/l) and then washing with 0.1 M NaOH, room temp., 20 min | 175 | 65 |
| 0.5 M NaOH, room temp. | 170 | — |

It is observed that the degree of retention of sucrose and the flow rate remain stable after the second grafting operation compared with the first grafting operation.

Example 7

Retention of Metal Ions by a Ti-EDA-grafted Membrane a) The retention of a 10 mM $Cu^{++}$ solution by a Ti-EDA-grafted S13 membrane (one or two grafting operations) is compared with that of an ungrafted sol-gel membrane.

The results obtained are featured in Table VII below:

TABLE VII

| Membrane | Flow rate of water 5.25 (1/h/m²) | Degree of retention of $Cu^{++}$ (%) |
|---|---|---|
| Kerasep ® sol-gel C10 | 146 | 55 |
| Kerasep ® sol-gel S13 + grafting of Ti-EDA (30 g/l) and then washing with 0.1 M NaOH, room temp., 20 min | 171 | 83 |

TABLE VII-continued

| Membrane | Flow rate of water 5.25 (1/h/m²) | Degree of retention of $Cu^{++}$ (%) |
|---|---|---|
| 0.5 M HCl, room temp., and then 0.1 M NaOH, room temp., 20 min | — | — |
| Kerasep ® sol-gel S13 + grafting of Ti-EDA (70 g/l) and then washing with 0.1 M NaOH, room temp., 20 min | 180 | 90 |
| 0.5 M HCl, room temp. and then 0.1 M NaOH, room temp. | 186 | — |

The increase in the retention of $Cu^{++}$ by the Ti-EDA membrane grafted with one or two layers is due to complexation of the ions by the grafts. In this case, the second grafting operation significantly improves the performance qualities in terms of specific retention of $Cu^{++}$, quite probably on account of a higher capacity of grafts bound to the zirconia.

In the particular case of the Ti-EDA membrane, it is found to be necessary to monitor the pH during the test, on account of the release of protons, resulting from the complexation of the $Cu^{++}$.

b) Similarly, the Retention of a $Zn^{++}$ Solution Was Assessed

The grafted membrane is a C11 sol-gel membrane.

It is converted according to the protocol described in Example 1 using a 30 g/l solution of Ti-PPC8 as grafting solution.

The membrane grafted with Ti-PPC8 is then hydrolysed with an NaOH solution (0.1 M) for two hours at room temperature.

The flow rate during filtration is, respectively, 156 $l.h^{-1}.m^{-2}$ for the C10 sol-gel membrane and 119 $l.h^{-1}.m^{-2}$ for the Ti-PP-grafted C11 membrane (10 bar, 20° C.). The clogging of the grafted membrane is greater than that of the ungrafted membrane in the presence of $Zn^{++}$.

Table VIII gives the $Zn^{++}$ retention values obtained on this membrane compared with an ungrafted membrane.

TABLE VIII

| Membrane | Flow rate of water 5.25 (1/h/m²) | Degree of retention of $Zn^{++}$ (%) |
|---|---|---|
| Kerasep sol-gel C10 | 124 | 38 |
| Ti-PP-grafted Kerasep sol-gel C11 | 107 | 47 |

It is noted that the retention of $Zn^{++}$ increases by 10% if a Ti-PP-grafted membrane is used. This is quite probably due to the complexation of the pyrophosphate groups of the grafted membrane with $Zn^{++}$.

Example 8

Retention of Proteins by Grafted Membranes According to the Invention

Lysozyme and bovine serum albumin (BSA) in separate solution at 1 g/L, pH 7, with 3.75 mM triethanolamine buffer are used as solute. These solutions are filtered.

The operating conditions are as follows: pressure applied 2 bar; linear rate 4–4.2 m/s; T=12° C. (BSA) and 20° C. (lysozyme).

KCl is added to vary the ionic strength. As regards the retentates and permeates, they are recycled so as to ensure a constant concentration.

The membrane used is a Carbosep M1 membrane. It is a membrane based on $ZrO_2/TiO_2$ bound to a carbon support. Its cutoff threshold is $150 \times 10^3$ daltons, with a length of 600 mm and width of 6 mm.

The membrane is converted according to the protocol described in Example 1, by grafting with Ti-PPC8 or TiC17.

The two grafted membranes are then hydrolysed with an NaOH solution (0.1 M) for two hours at room temperature.

These two membranes obtained, M1-Ti and M1-Ti-PP, as well as the ungrafted control membrane M1, are used to filter lysozyme and BSA solutions. Their hydraulic permeabilities $L_p$ determined for water at a pressure of 1 bar and a temperature of 20° C. are, respectively, 73, 72 and 75 $l.h^{-1}.m^2.bar^{-1}$.

Figure 1:
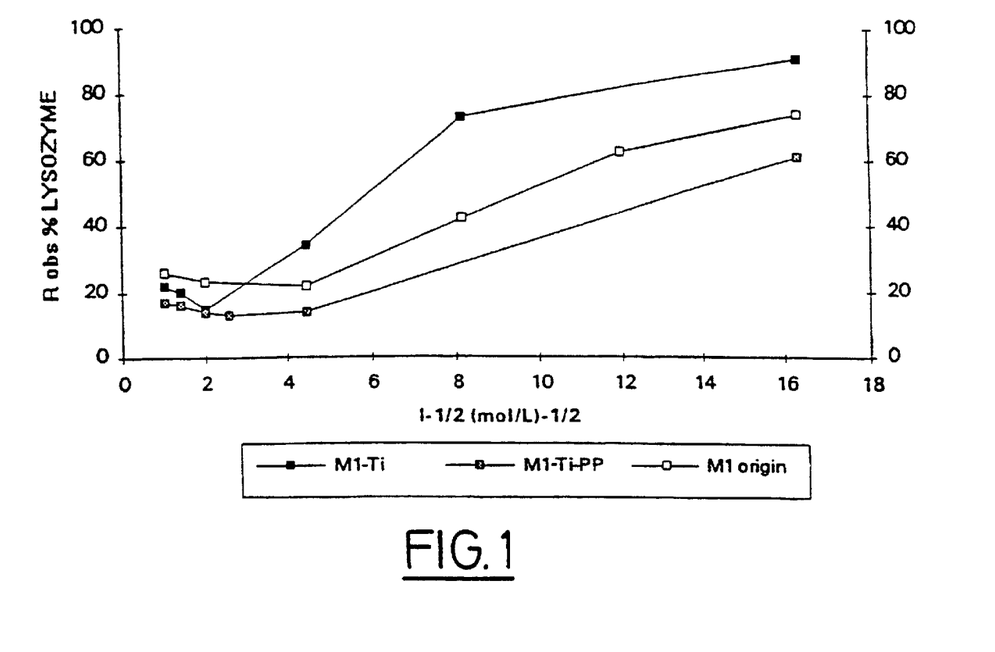
FIG. 1: comparison of the retention of lysozyme (pH=7, buffer: 3.75 mM TEA) by a Carbosep® M1 membrane, Ti-PP-grafted M1 membrane and Ti-grafted M1 membrane.
Figure 2:
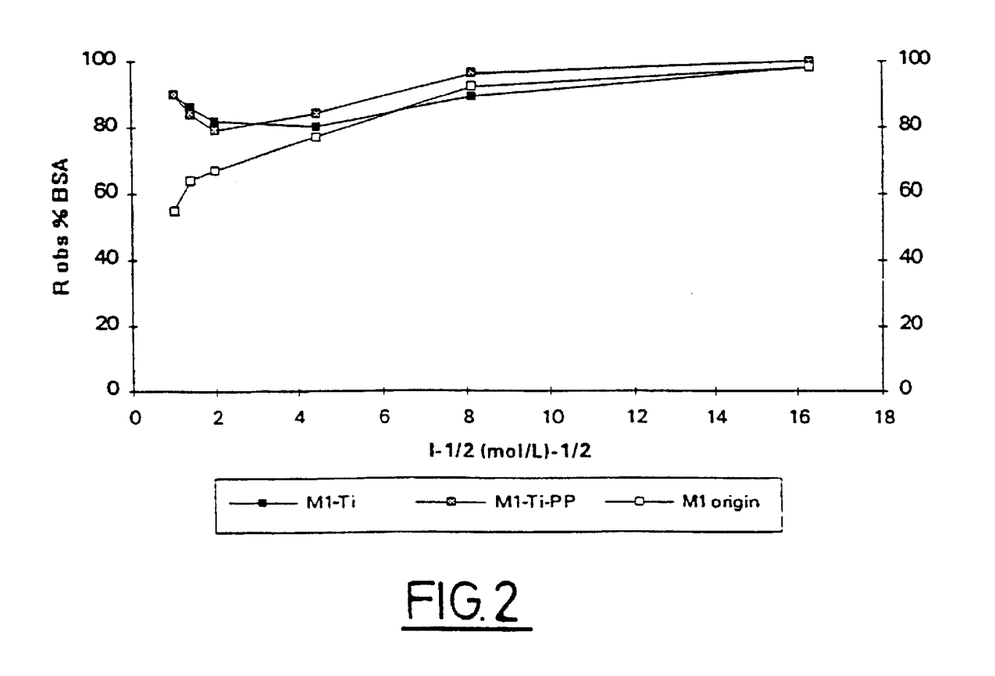
FIG. 2: comparison of the retention of BSA (pH=7, buffer: 3.75 mM TEA) by a Carbosep® M1 membrane, Ti-PP-grafted M1 membrane and Ti-grafted M1 membrane.

The behaviours of each of the Carbosep membranes M1, M1-Ti-PP and M1-Ti are illustrated in FIG. 1 (for lysozyme) and FIG. 2 (for BSA).

The degree of retention observed is expressed therein as a function of the inverse of the square root of the ionic strength; this makes it possible to know in particular if the electric charge effects are the main forces.

For lysozyme, which is positively charged, large variations in retention are observed at low ionic strength on account of the electrical repulsions.

In the case of BSA, the greatest variations in retention are obtained at high ionic strength.

What is claimed is:

1. An inorganic filtration membrane comprising a support made of inorganic material coated with at least one separating membrane layer comprising particles of metal hydroxides and/or oxides, at the surface of which are covalently grafted organomineral units and/or mineral units derived from the treatment of said grafted organomineral units.

2. An inorganic membrane according to claim 1, wherein the organomineral and/or mineral units are grafted at the surface of the separating membrane layer by covalent bonds established between the mineral functions of the organomineral and/or mineral units and those of the metal hydroxides and/or oxides in said separating membrane layer.

3. An inorganic filtration membrane according to claim 1, wherein the grafted organomineral and/or mineral units are derived from hydrolysable organometallic complexes comprising at least one titanium and/or zirconium atom.

4. An inorganic filtration membrane according to claim 1, wherein the grafted organomineral and/or mineral units are derived from hydrolysable organometallic complexes comprises organotitanates, organozirconates and/or organozircoaluminates.

5. An inorganic filtration membrane according to claim 1, wherein the grafted organomineral and/or mineral units are derived from hydrolysable organometallic complexes with said organometallic complex comprising:

an organotitanate or organozirconate corresponding to either of formulae I and II below:

I

II in which:

M represents a titanium or zirconium atom,

R represents a group $R_1$ and $R_2$, which may be identical or different, represent a non-hydrolysable organic radical, X represents a methylene or CO group, m and n are equal to 0, 1, 2 or 3 and p is equal to 1 or 2 on condition that the sum of n, p and m is equal to 4 and with when p is equal to 1,

$Z_1$ and $Z_2$, which may be identical or different, representing

—O—, —OC(O)—, —OC(O)O—, —OP(O)(O—)$_2$, —OP(O)(OH)P(O)(O—)$_2$, OP(O)(OH)P(O)(O—)$_3$, OP(O)(O—)$_3$, OS(O)$_2$— or OS(O)$_2$(—)$_3$ and when p is equal to 2, $Z_1$ and $Z_2$ together forming a divalent chain of cyclic structure such as a cyclopyrophosphite; or is:

an organozircoaluminate corresponding to the general formula III below:

III with R representing a $(CH_2)_2$, $(CH_2)_4$ or $(CH_2)_{12}$ hydrocarbon-based chain and X representing an $NH_2$, SH, OH, COOH or group.

6. An inorganic filtration membrane according to claim 1, wherein the grafted organomineral and/or mineral units are derived from hydrolysable organometallic complexes with the organometallic complex being an organotitanate or organozirconate comprising:

isopropyl tri(N-ethylaminoethylamino)titanate,
necalkoxytri(N-ethylaminoethylamino)titanate,
neoalkoxytri(neodecanoyl)titanate,
isopropyl tri(isostearoyl)titanate,
isopropyl tri(dioctylphosphato)titanate,
trinecalkoxy(dioctylphosphato)titanate,
trineoalkoxy(neodecanoyl)zirconate,
trineoalkoxy(dodecanoyl)henzenesulphonyl-zirconate,
trineoalkoxy(ethylenediaminoethyl)zirconate, and/or
trinecalkoxy(m-aminophenyl)zirconate.

7. An inorganic filtration membrane according to claim 1, wherein the mineral units grafted onto the surface are obtained by removing the organic functions present on grafted organomineral units.

8. An inorganic filtration membrane according to claim 1, wherein the mineral units grafted onto the surface are Ti(OH)3, Ti(OH)2, Zr(OH)3 and/or Zr(OH)2, obtained by removing the organic functions present on grafted organomineral units.

9. An inorganic filtration membrane according to claim 1, wherein the degree of grafting ranges between about 10 and about 80%.

10. An inorganic filtration membrane according to claim 1, which contains various grafted organomineral units and/or various grafted mineral units.

11. An inorganic filtration membrane according to claim 1, wherein the support is composed of carbon, glass, metal carbides, a metal, metal oxides or silicon carbide.

12. An inorganic filtration membrane according to claim 1, wherein the support is a ceramic monolithic support with an average equivalent pore diameter Ds of between 1 and 20 μm and a porosity of greater than 30%.

13. An inorganic filtration membrane according to claim 1, wherein the support is a ceramic monolithic support with an average equivalent pore diameter Ds of between 1 and 20 μm and a porosity of greater than 30% and is made of grains of alumina $Al_2O_3$ at least partially coated with grains of titanium oxide $TiO_2$.

14. An inorganic filtration membrane according to claim 1, wherein the separating membrane layer is made of titanium oxide, alumina and/or zirconia.

15. An inorganic filtration membrane comprising a support made of inorganic material coated with at least one separating membrane layer comprising particles of metal hydroxides and/or oxides, comprising, at the surface of said separating membrane layer, a molecular layer comprising organomineral units grafted onto the surface of the said separating layer, said organomineral units corresponding to the general formula IV below:

$$(RO)_pM[Z_1R_1]n[Z_2R_2]_m \qquad \text{IV}$$

in which:

M represents a titanium or zirconium atom,

R represents a group

*$(CH_3)_2CH$—

*$CH_2$=$CH$—$CH_2$—$O$—$CH_2$
                           |
          $CH_3$—$CH_2$—$C$—$CH_{2x}$   or
                           |
$CH_2$=$CH$—$CH_2$—$O$—$CH_2$

*$CH_3(OC_2H_4)_2$—

$R_1$ and $R_2$, which may be identical or different, represent a non-hydrolysable organic radical, m and n are equal to 0, 1, 2 or 3 and p is equal to 1 or 2, on condition that the sum of n, p and m is equal to 4 and with when p is equal to 1, $Z_1$ and $Z_2$, which may be identical or different, representing —O—, —OC(O)—, —OC(O)O—, —OP(O)(O—)$_2$, —OP(O)(OH)P(O)(O—)$_2$, OP(O)(OH)P(O)(O—)$_3$, OP(O)(O—)$_3$, OS(O)$_2$— or OS(O)$_2$(—)$_3$ and when p is equal to 2, $Z_1$ and $Z_2$ together forming a divalent chain of cyclic structure such as a cyclopyrophosphite.

16. An inorganic filtration membrane according to claim 15, wherein the grafted or organomineral units are groups comprising tri(N-ethyl-aminoethylamino)titanate, tri(neodecancyl)titanate, tri(isostearoyl)titanate and/or tris(dioctylphosphato)titanate derivatives.

17. A method for nanofiltration, ultrafiltration or microfiltration, comprising contacting the inorganic filtration membrane according to claim 1 with a material to be filtered.

18. A method for isolating and/or separating solutes present in a solution, comprising contacting the inorganic filtration membrane according to claim 1 with a solution containing solutes.

19. The method according to claim 18, wherein the solutes are metal ions, chemical compounds and/or proteins.

20. A process which is useful for preparing an inorganic filtration membrane which is modified by grafting with organomineral and/or mineral units as defined in claim 1, which comprises:

conditioning the separating membrane layer to be modified in the solvent of the grafting solution, circulating the grafting solution, comprising at least one organomineral to be grafted, through the conditioned separating membrane layer, under operating conditions that are suitable for carrying out said grafting, rinsing said grafted separating membrane layer, so as to remove the excess of unreacted organominerals, and optionally, treating the grafted organomineral units in order to remove their organic functions, and drying said grafted membrane.

21. A process according to claim 20, wherein the organomineral to be grafted is a hydrolysable organometallic complex comprising at least one titanium or zirconium atom.

22. A process according to claim 20, wherein the organomineral to be grafted is an organotitanate or organozirconate, corresponding to either of the general formulae I and II below:

$$(RO)_p\text{—}M\text{—}[Z_1R_1]_n[Z_2R_2]_m \qquad \text{I}$$

$$X\underset{O}{\overset{O}{\diagdown}}M[Z_1R_1]_2 \qquad \text{II}$$

in which:

M represents a titanium or zirconium atom,

R represents a group

*$(CH_3)_2CH$—

*$CH_2$=$CH$—$CH_2$—$O$—$CH_2$
                           |
          $CH_3$—$CH_2$—$C$—$CH_{2x}$   or
                           |
$CH_2$=$CH$—$CH_2$—$O$—$CH_2$

*$CH_3(OC_2H_4)_2$—

$R_1$ and $R_2$, which may be identical or different, represent a non-hydrolysable organic radical, X represents a methylene or CO group, m and n are equal to 0, 1, 2 or 3 and p is equal to 1 or 2 on condition that the sum of n, p and m is equal to 4 and with when p is equal to 1, $Z_1$ and $Z_2$, which may be identical or different, representing —O—, —OC(O)—, —OC(O)O—, —OP(O)(O—)$_2$, —OP(O)(OH)P(O)(O—)$_2$, OP(O)(OH)P(O)(O—)$_3$, OP(O)(O—)$_3$, OS(O)$_2$— or OS(O)$_2$(—)$_3$ and when p is equal to 2, $Z_1$ and $Z_2$ together forming a divalent chain of cyclic structure; and/or comprising:

isopropyl tri(N-ethylaminoethylamino)titanate,
neoalkoxytri(N-ethylaminoethylamino)titanate,
neoalkoxytri(neodecanoyl)titanate,
isopropyl tri(isostearoyl)titanate,
isopropyl tri(dioctylphosphato)titanate,
trineoalkoxy(dioctylphosphato)titanate,
trineoalkoxy(neodecanoyl)zirconate,
trineoalkoxy(dodecanoyl)benzenesulphonyl-zirconate,
trineoalkoxy(ethylenediamincethyl)zirconate, and
trineoalkoxy(m-aminophenyl)zirconate.

23. A process according to claim 20, wherein the grafting solvent is an alcoholic solvent.

24. A process according to claim 20, wherein the grafting solvent is isopropanol.

25. A process according to claim 20, wherein the grafting solution has a concentration of between about 5 and about 100 g/l of at least one organomineral.

26. A process according to claim 20, wherein the concentration of the grafting solution is between about 20 and about 70 g/l of at least one organomineral.

27. A process according to claim 20, wherein the inorganic membrane to be modified comprises a support composed of carbon, glass, metal carbides, a metal, metal oxides or silicon carbide.

28. A process according to claim 20, wherein the inorganic membrane to be modified comprises a ceramic monolithic support with an average equivalent pore diameter Ds of between 1 and 20 μm and a porosity of greater than 30%.

29. A process according to claim 20, wherein the inorganic membrane to be modified comprises a ceramic monolithic support with an average equivalent pore diameter Ds of between 1 and 20 μm and a porosity of greater than 30% and said ceramic being made of grains of alumina $Al_2O_3$ at least partially coated with grains of titanium oxide $TiO_2$.

30. A process according to claim 20, wherein the inorganic membrane to be modified comprises a separating membrane layer made of titanium oxide, alumina and/or zirconia.

31. A process according to claim 20, wherein the conditioning of the membrane to be grafted is carried out in a closed circuit.

32. A process according to claim 20, wherein the grafting operation is carried out in a closed circuit with recycling of the permeate and of the retentate.

33. A process according to claim 20, wherein the said grafted membrane, freed of the excess organominerals by rinsing and not dried, undergoes an acidic or alkaline hydrolysis in oxidative medium to remove the organic functions present on the grafted organomineral units.

34. A process according to claim 20, wherein the membranes grafted with mineral units, obtained after said process, are subjected to a new grafting operation.

* * * * *